(12) United States Patent
Henion et al.

(10) Patent No.: US 9,862,321 B2
(45) Date of Patent: Jan. 9, 2018

(54) TELESCOPING REARVIEW ASSEMBLY WITH CAMERA AND LENS WIPING SYSTEM

(71) Applicant: SMR Patents S.A.R.L., Luxembourg (LU)

(72) Inventors: Paul Henion, Port Huron, MI (US); Darryl Brooks, Romeo, MI (US); Gary Sinelli, Birmingham, MI (US)

(73) Assignee: SMR PATENTS S.A.R.L., Luxembourg (LU)

( * ) Notice: Subject to any disclaimer, the term of this patent is extended or adjusted under 35 U.S.C. 154(b) by 0 days.

(21) Appl. No.: 15/364,362

(22) Filed: Nov. 30, 2016

(65) Prior Publication Data

US 2017/0080863 A1   Mar. 23, 2017

Related U.S. Application Data

(63) Continuation-in-part of application No. 14/013,378, filed on Aug. 29, 2013.

(60) Provisional application No. 61/694,293, filed on Aug. 29, 2012.

(51) Int. Cl.
| | |
|---|---|
| *B60R 1/12* | (2006.01) |
| *B60R 1/06* | (2006.01) |
| *B60R 1/076* | (2006.01) |
| *B60S 1/56* | (2006.01) |
| *H04N 5/225* | (2006.01) |

(Continued)

(52) U.S. Cl.
CPC ............ *B60R 1/0602* (2013.01); *B60R 1/003* (2013.01); *B60R 1/076* (2013.01); *B60R 1/078* (2013.01); *B60R 1/12* (2013.01); *B60S 1/566* (2013.01); *H04N 5/2252* (2013.01); *B60R 2001/1253* (2013.01)

(58) Field of Classification Search
CPC B60R 1/003; B60R 1/078; B60R 1/12; B60R 2001/1253
See application file for complete search history.

(56) References Cited

U.S. PATENT DOCUMENTS

| | | |
|---|---|---|
| 5,813,717 A | 9/1998 | Wilson |
| 6,511,189 B1 | 1/2003 | Henion et al. |
| 7,748,857 B2 | 7/2010 | Fimeri et al. |

(Continued)

FOREIGN PATENT DOCUMENTS

| | | |
|---|---|---|
| DE | 102012015950 B3 | 1/2014 |
| WO | 2011/085745 A1 | 7/2011 |

*Primary Examiner* — Jamie Atala
*Assistant Examiner* — Hesham Abouzahra
(74) *Attorney, Agent, or Firm* — MacMillan, Sobanski & Todd, LLC

(57) ABSTRACT

A rear-view side mirror assembly includes a base for attachment to a vehicle, one or more support arms extending from the base, and a mirror head attached to the support arm and configured for telescoping movement along the support arm. A camera is fixedly attached to the support arm so as to remain stationary relative to the mirror base and vehicle as the mirror head telescopes inward and outward. An elongated aperture in the mirror head housing ensures that the camera lens is not occluded as the mirror head telescopes between a retracted position and an extended position. A lens cleaning system is adapted to wipe the lens clean each time the housing telescopes between inboard and outboard positions.

19 Claims, 7 Drawing Sheets

(51) Int. Cl.
*B60R 1/00* (2006.01)
*B60R 1/078* (2006.01)

(56) References Cited

U.S. PATENT DOCUMENTS

| | | |
|---|---|---|
| 2002/0003571 A1* | 1/2002 | Schofield ................ B60C 23/00 348/148 |
| 2003/0103142 A1* | 6/2003 | Hitomi .................... B60R 1/074 348/148 |
| 2003/0193613 A1* | 10/2003 | Matko ....................... B60R 1/00 348/375 |
| 2004/0246608 A1* | 12/2004 | Wellington ............... B60R 1/07 359/877 |
| 2005/0200988 A1 | 9/2005 | Olijnyk et al. |
| 2009/0086346 A1* | 4/2009 | Henion ................. B60R 1/1207 359/841 |
| 2010/0110188 A1 | 5/2010 | Brester |
| 2013/0088599 A1 | 4/2013 | Ulomek et al. |
| 2013/0302024 A1 | 11/2013 | Eckert et al. |
| 2014/0063233 A1 | 3/2014 | Henion et al. |
| 2014/0063245 A1 | 3/2014 | Bowers et al. |

* cited by examiner

TELESCOPING REARVIEW ASSEMBLY WITH CAMERA AND LENS WIPING SYSTEM

This application claims priority from U.S. patent application Ser. No. 14/013,378, filed Aug. 29, 2013, pending, which claims priority from U.S. provisional application Ser. No. 61/694,293, filed Aug. 29, 2012, both of which are incorporated herein.

BACKGROUND

Certain vehicles are equipped with structures such as tow bars and the like to tow trailers, campers, boats, mobile homes, etc. Sometimes the towed vehicles are so wide that typical side view mirrors do not extend far enough from the vehicle to allow the vehicle operator to see around the towed vehicle. Accordingly, it is known to equip the towing vehicle with side view mirrors that can extend, in a telescoping manner, from a retracted or inboard position that is relatively close to the vehicle to an extended or outboard position sufficient to allow the vehicle operator to adequately see around the towed vehicle.

In certain embodiments, the towing vehicle can be equipped with cameras designed to enhance the view of the vehicle operator of hard-to-see areas around the periphery of the vehicle. In some embodiments, the cameras can be incorporated into the side-location rearview mirrors and configured to provide views of the sides and rear of the vehicles.

US2014/0063244 to Bowers discloses a telescoping mirror in which a camera is positioned in a housing window, but remains stationary relative to the vehicle. In one embodiment, a cover member is attached to the camera and seals the window on either side of the camera as the housing telescopes. German patent publication DE102012015950B3 discloses a camera cleaning system for cameras that are placed in the front or in the mirror of a vehicle. The cleaning system be actuated by several mechanisms, including the action of the driver or by regular automatic events like slow speed or folding a mirror.

Still, there are issues with dust, dirt, and grime entering the housing and soiling the elements, including camera lenses. It would be advantageous if telescoping side mirrors incorporating cameras could be improved. The present invention seeks to improve driver visibility in a number of ways.

SUMMARY OF THE INVENTION

In one aspect, the invention relates to a rear-view side mirror assembly for attachment to a vehicle, the side mirror assembly comprising:

one or more support arms attached to and extending from a mirror base assembly configured for attachment to a portion of a vehicle;

a mirror head attached to the one or more support arms such that the mirror head can telescope relative to the mirror base; and a camera positioned within the mirror head and attached to the one or more support arms, the camera configured to provide images exterior to the vehicle, wherein the camera is configured to remain in a stationary position relative to the mirror base as the mirror head telescopes.

The mirror head is configured to telescope along a portion of the support arms between the extremes of a fully retracted position and a fully extended position, including any intermediate position between the extremes. There may be one or more cameras positioned in the mirror head and the camera may be directed to view generally downward, outward, and/or rearward from the vehicle.

In some embodiments, the mirror head has an aperture, such as an elongated aperture, to provide a viewing port for a lens of the camera regardless of the telescoped position of the mirror head. The aperture may be generally rectangular, trapezoidal, oval or elliptical in shape.

In some embodiments, the mirror head further comprises a flexible track configured to cover a portion of the elongated aperture adjacent the camera lens regardless of the telescoped position of the mirror head. The track may be held in position by one or more track guides, which may be part of a larger track guide assembly and may be in opposing positions to thus form a channel, such as a U-shaped channel to guide the flexible track. In some embodiments, free ends of the flexible track merely flex into the mirror head housing, while in other embodiments, the flexible track forms a continuous band and has no free ends. In some embodiments, the continuous band flexible track slides over stationary track guides, while in other embodiments, the continuous band flexible track engages roller drums at each end of the band.

In another aspect, the invention relates to a housing maintenance system for keeping the interior components of a side-location, rear-view housing assembly clean and operable. Such a housing maintenance system may comprise one or more of a flexible track closing the aperture, as described above, a lens cleaning wiping system for cleaning the lens of a camera mounted in a housing, and a washer fluid system for wetting the lens or wiper element of a lens cleaning system. This aspect relates to a side-location rearview assembly comprising:

one or more support arms attached to and extending from a base assembly configured for attachment to a side portion of a vehicle;

a rearview housing slidingly attached to the one or more support arms such that the housing can telescope relative to the base between a retracted, inboard position and an extended, outboard position; and a camera positioned within the housing and attached to the one or more support arms, the camera configured to provide images exterior to the vehicle via a lens extending into an elongated aperture in the housing, wherein the camera lens is configured to remain in a stationary position relative to the base as the housing telescopes, and wherein the elongated aperture is configured relative to the camera lens such that the camera can obtain images exterior to the vehicle through the elongated aperture as the housing is telescoped between the inboard and outboard positions; and further comprising a housing maintenance system for keeping the housing clean and operable.

As noted above, there a multiple embodiments of the housing maintenance system. A first embodiment is a flexible track configured to cover a portion of the elongated aperture adjacent the camera lens regardless of the telescoped position of the mirror head. The track may be held in position by one or more track guides, which may be part of a larger track guide assembly and may be in opposing positions to thus form a channel, such as a U-shaped channel to guide the flexible track. In some embodiments, free ends of the flexible track merely flex into the mirror head housing, while in other embodiments, the flexible track forms a continuous band and has no free ends. In some embodiments, the continuous band flexible track slides over stationary track guides, while in other embodiments, the continuous band flexible track engages roller drums at each end of the band.

A second embodiment of the housing maintenance system includes a lens cleaning system having a wiper element disposed in a holder that is fixed to the housing so as to engage and clean the camera lens in the elongated slot as the housing is telescoped between the inboard and outboard positions. The lens cleaning system may comprise a bracket that extends over the elongated aperture, the bracket supporting a wiper element that engages and cleans the lens. The bracket and wiper generally occupy no more than one third of the length of the elongated aperture, more typically 25% or less, in the central region of the aperture. The wiper element may be a fabric, brush, elastomeric polymer, rubber, or sponge material.

A third embodiment of the housing maintenance system, or alternatively an aspect of the lens cleaning system, is source of washer fluid and a dispensing tube for dispensing washer fluid on the camera lens or on the wiper element of the leans cleaning system. The washer fluid may be pressurized so as to be dispensed at its target under force by spraying or by simple gravity feed. Conventional valves and controls may be used to activate the washer fluid spray.

DETAILED DESCRIPTION OF THE INVENTION

Figure 1:
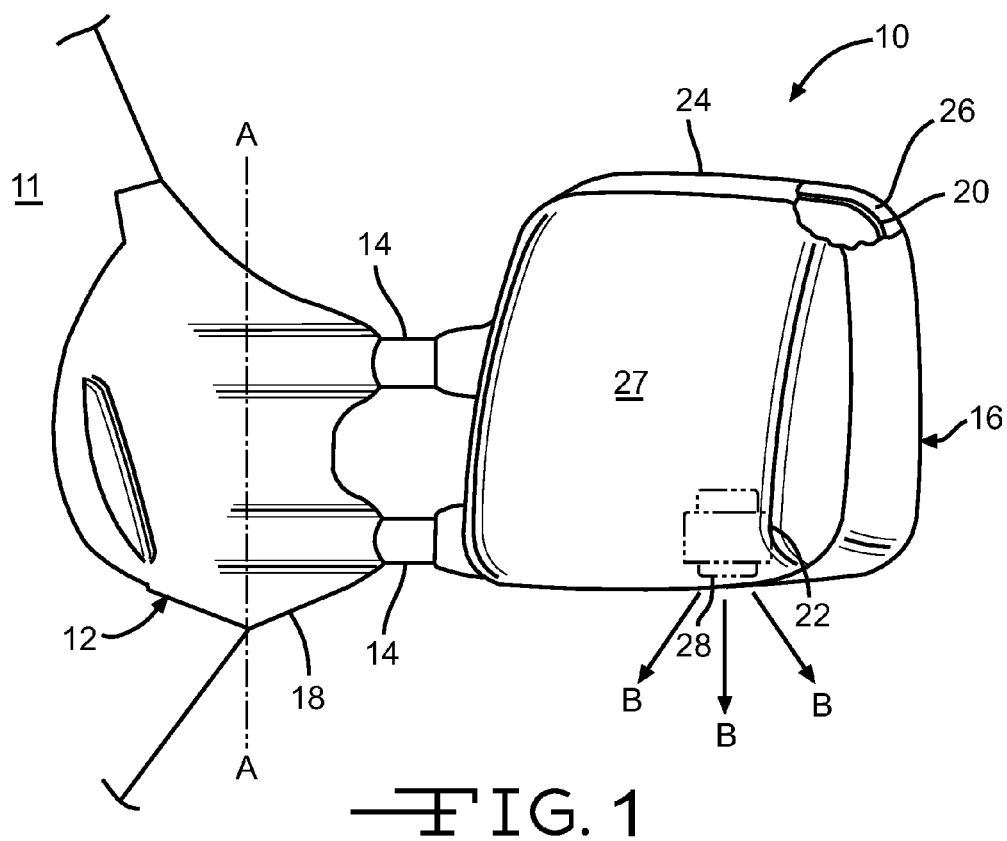
FIG. 1 is a perspective view of a telescoping side view mirror assembly incorporating a camera.

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The description and figures disclose a side view mirror assembly (hereafter "mirror assembly") having a camera with a fixed position relative to a telescoping mirror head. Generally, the camera is positioned within the mirror head in a fixed position relative to the side of the vehicle as the mirror head telescopes from a retracted position to an extended position. The term "side view mirror", as used herein, is defined to mean an assembly attached to the vehicle and which permits the vehicle operator to adequately see around the towed vehicle. The assembly includes a mirror head, one or more support arms and a mirror base assembly. This definition of side view mirror is intended to include those embodiments wherein the side view mirror is attached to any portion of the vehicle. The term "mirror head", as used herein, is defined to mean an assembly including a housing, a scalp, a mirror and devices for rotating the mirror. The term "support arms", as used herein, is defined to mean structures configured to extend the mirror head from the side of a vehicle. The term "mirror base assembly", as used herein, is defined to mean one or more structures configured to attach the mirror head and support arms to the side of a vehicle. The terms "telescopes" or "telescoping," as used herein, is defined to mean the movement of the mirror head relative to the vehicle generally along the axis of the support arms, typically although not necessarily corresponding to an inboard or retracted position and an outboard or extended position.

Referring now to FIG. 1, a mirror assembly is shown generally at 10. The mirror assembly 10 is configured for installation on a vehicle 11. In certain embodiments, the mirror assembly 10 is configured for installation on a side door of the vehicle. However, it should be understood that in other embodiments the mirror assembly 10 can be installed on other portions of the vehicle, such as for example the non-limiting examples of the frame, quarter panels or fenders. The mirror assembly 10 is further configured to provide the occupants of the vehicle with a view extending to the rear of the vehicle. In certain embodiments, the mirror assembly 10 can optionally be configured as a break-away design, although it should understood that the mirror assembly 10 can be practiced without a break-away design.

The mirror assembly 10 includes a mirror base assembly 12, one or more support arms 14 and a mirror head 16. The mirror base assembly 12 and support arms 14 are known in the industry and therefore will only be briefly described herein.

The mirror base assembly 12 is configured to attach the support arms 14 and the mirror head 16 to a vehicle. In the illustrated embodiment, the mirror base assembly 12 includes a base structure (not shown) and a base cover 18. The base structure is configured to mount the support arms 14 to the vehicle. Any desired mechanism, device or structure, sufficient to mount the support arms 14 to the vehicle can be used. Optionally, the base structure can be configured such that the support arms 14 can pivot about a substantially vertical axis A-A (FIG. 1). However, it should be understood that the mirror assembly 10 can be practiced without pivoting of the support arms 14 about the axis A-A. In still other embodiments, the mirror assembly 10 can be configured to pivot about an axis that is not substantially vertical.

The base cover 18 is configured to cover the base structure with an aesthetically pleasing appearance that may or may not match the color and finish of the vehicle. Any desired base cover 18 can be used.

The support arm or arms 14 extend from the mirror base assembly 12 and are configured to connect the mirror base assembly 12 with the mirror head 16. In the illustrated embodiment, the support arms 14 are hollow and have an ovular cross-sectional shape. However in other embodiments, the support arms 14 can have other cross-sectional shapes, such as circular cross-sectional shapes, sufficient to connect the mirror base assembly 12 with the mirror head 16. In the illustrated embodiment, the support arms 14 have internal mechanisms and devices configured to retract and extend the mirror head 16 in a direction along a length of the support arms 14. However, it should be appreciated that in other embodiments, the mechanisms and devices for retracting and extending the mirror head 16 can be positioned in other locations, such as for example the non-limiting example of within the mirror head 16. Mechanisms and devices for telescoping the mirror head 16 relative to the base 12 and vehicle 11 are well known in the art and need not be described in detail herein. (See, e.g. U.S. Pat. No. 7,748,857 to Belcher, et al and assigned to SMR Patents S.A.R.L.)

While the embodiment shown in FIG. 1 illustrates a quantity of two support arms 14, it should be appreciated that in other embodiments a quantity of one support arm or more than two support arms can be used.

Referring again to FIG. 1, the mirror head 16 is configured for several functions. First, the mirror head 16 is configured in some embodiments to support a mirror 20, which will be discussed in more detail below. In other embodiments, the mirror 20 is optional, and the term "mirror head" should not be construed as necessarily requiring a reflective mirror element 20. Second, the mirror head 16 is configured as an enclosure for devices and mechanisms arranged to initiate and control movement of the mirror 20 relative to the mirror head 16. Non-limiting examples of such devices and mechanisms include drive motors, rack and pinion gears and the like. Third, the mirror head 16 is configured for movement along the support arms 14, often from a retracted position to an extended position. In an extended position, the mirror head positions the mirror 20 for better vision around a wide towed vehicle. Fourth, the mirror head is configured as an enclosure for a camera 22. The camera 22 will be discussed in more detail below.

The mirror head 16 includes a housing 24. The housing 24 may be of any desired shape and includes various outer walls that merge together in a smooth manner such as to present a pleasing appearance. A rearward facing portion of the housing 24 is open and forms a cavity 26 in some embodiments. The cavity 26 is configured to receive the optional mirror 20. The mirror 20 may be any suitable type, such as a flat, concave or convex mirror, or the type which automatically adjusts to reduce glare. A suitable shaped support member (not shown) is secured within the housing 24 and serves to movably support the mirror 20 within the cavity 26. The support member may include suitable mechanisms, such as drive motors and the like for remote control adjustment of the mirror 20, as well as various devices for heating the mirror 20 if desired. As thus far described, the mirror assembly 10 is typical to the existing mirror assemblies commonly employed on various vehicles.

Referring again to FIG. 1, a forward-facing, decorative scalp 27 is attached to the housing 24 and is configured to enclose the forward-facing portion of the housing 24. As with the base cover 18, the scalp 27 can have an aesthetically pleasing appearance that may or may not match the color and finish of the vehicle. The scalp 27 is configured to move with the mirror head 16, as the mirror head 16 moves along the support arms 14. The scalp 27 will be discussed in more detail below.

Referring again to FIG. 1, the mirror head 16 is further equipped with the camera 22. In the illustrated embodiment, the camera 22 is of the type to provide real-time digital images. However, in other embodiments, the camera 22 can provide other types of images. Optionally, the images from the camera 22 can be digitally combined with other images from other cameras to provide the vehicle occupants with a virtual "around-the-vehicle" view. While not shown in FIG. 1, power and image conducting cables 21 (see FIGS. 3A, 3B, 4A and 4B) can extend from the camera. In certain embodiments, the power and image conducting cables 21 can be ducted through the support arms 14 to controls located within the interior of the vehicle.

The camera 22 is positioned such that a viewing lens 28 is oriented in a direction to provide images in generally downward and outward directions as indicated by the direction arrows B. However, it should be appreciated that the camera 22 and the viewing lens 28 can be positioned in other orientations suitable to provide other images, such as rearward and/or outward. It should also be appreciated that the camera 22 can be equipped with different types of lens to provide different desired visual effects or images. As non-limiting examples, the camera 22 can be equipped with a wide-angle or fish-eye lens suitable to provide desired peripheral images. While the embodiment illustrated in FIG. 1 illustrates a single camera 22, in other embodiments more than one camera may be positioned within the mirror head 16.

Referring again to FIG. 1 and as will be discussed in more detail below, the camera 22 is attached to the support arms 14 such that the camera 22 remains stationary relative to the side of the vehicle as the mirror head 16 telescopes along a length of the support arms 14, from a retracted, inboard position to an extended, outboard position or to intermediate positions.

Figure 2A:
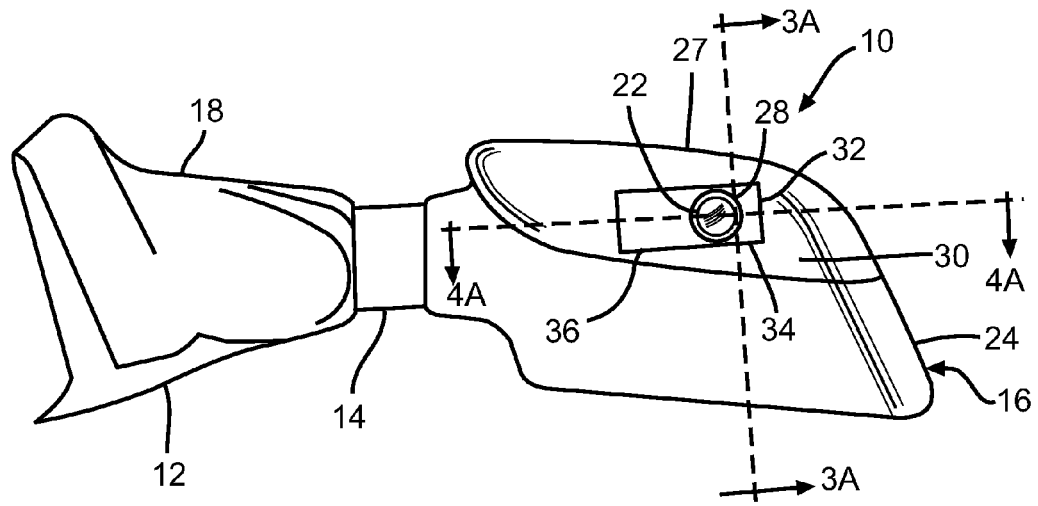
FIG. 2A is a bottom view of the telescoping side view mirror assembly of FIG. 1 illustrating the camera with a mirror head in a retracted position.
Figure 2B:
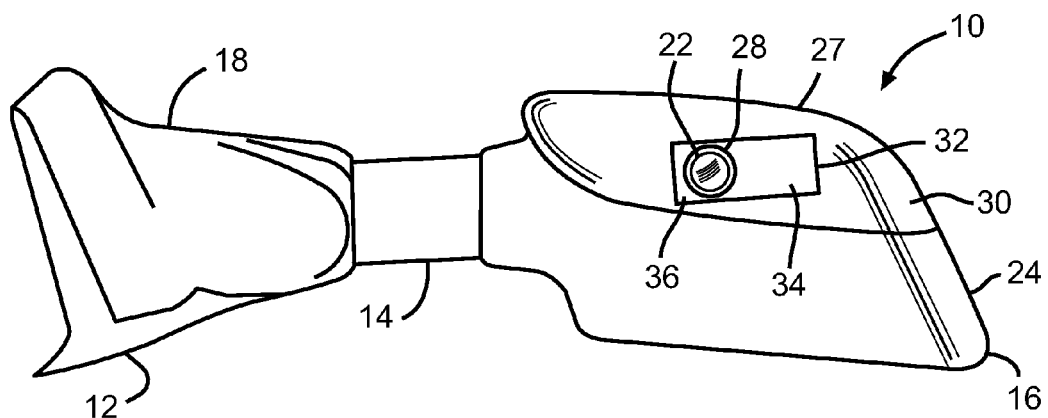
FIG. 2B is a bottom view of the telescoping side view mirror assembly of FIG. 1 illustrating the camera with a mirror head in an extended position.

Referring now to FIGS. 2A and 2B, a view of the bottom of the mirror assembly 10 is illustrated. As discussed above, the forward-facing scalp 27 is attached to the housing 24 of the mirror head 16. The scalp 27 includes a bottom portion 30. The bottom portion 30 of the scalp 27 includes an aperture 32. The aperture 32 is configured to provide the lens 28 of the camera 22 with a viewing port through the bottom portion 30 of the scalp 27 as the mirror head 16 moves along the support arms 14. In the illustrated embodiment, the aperture 32 has a rectangular cross-sectional shape. However, in other embodiments, the aperture 32 can have other cross-sectional shapes, such as for example an ovular cross-sectional shape, sufficient to provide the lens 28 of the camera 22 with a viewing port through the scalp 27 as the mirror head 16 moves in a telescoping manner relative to the camera 22, which remains in a fixed position relative to the support arms 14, the base unit 18 and the towing vehicle 11. The aperture 32 has a first end 34 and a second end 36, both of which will be discussed in more detail below.

Referring now to FIG. 2A, the mirror head 16 is shown in a retracted position. In a retracted position, the mirror head 16 is positioned along a length of the support arms 14 such as to be located relatively close to the vehicle (not shown). As a result of the retracted position of the mirror head 16, the camera 22 is positioned such that the lens 28 is exposed through the first end 34 of the aperture 32.

Referring now to FIG. 2B, the mirror head 16 is shown in an extended position. In an extended position, the mirror head 16 is positioned along a length of the support arms 14 such as to be further away from the vehicle (not shown) and allow the vehicle occupants to adequately see around the towed vehicle. As a result of the extended position of the mirror head 16, the camera 22 is positioned such that the lens 28 is exposed through the second end 36 of the aperture 32. The aperture 32 is generally elongated along an axis parallel to the support arms 14, but may take on any of alternative elongated shapes such as rectangular, trapezoidal, elliptical or oval.

While FIGS. 2A and 2B show the extreme positions of the lens 28 of the camera 22 relative to the aperture 32 as the mirror head 16 travels along the support arms 14, i.e., from a retracted position to an extended position, it should be appreciated that the mirror head 16 can have an infinite number of intermediate positions between the retracted position and the extended position. Accordingly, the aperture 32 is configured to provide the lens 28 of the camera 22 with a viewing port through the scalp 27 regardless of the position of the mirror head 16 along the support arms 14.

Figure 3A:
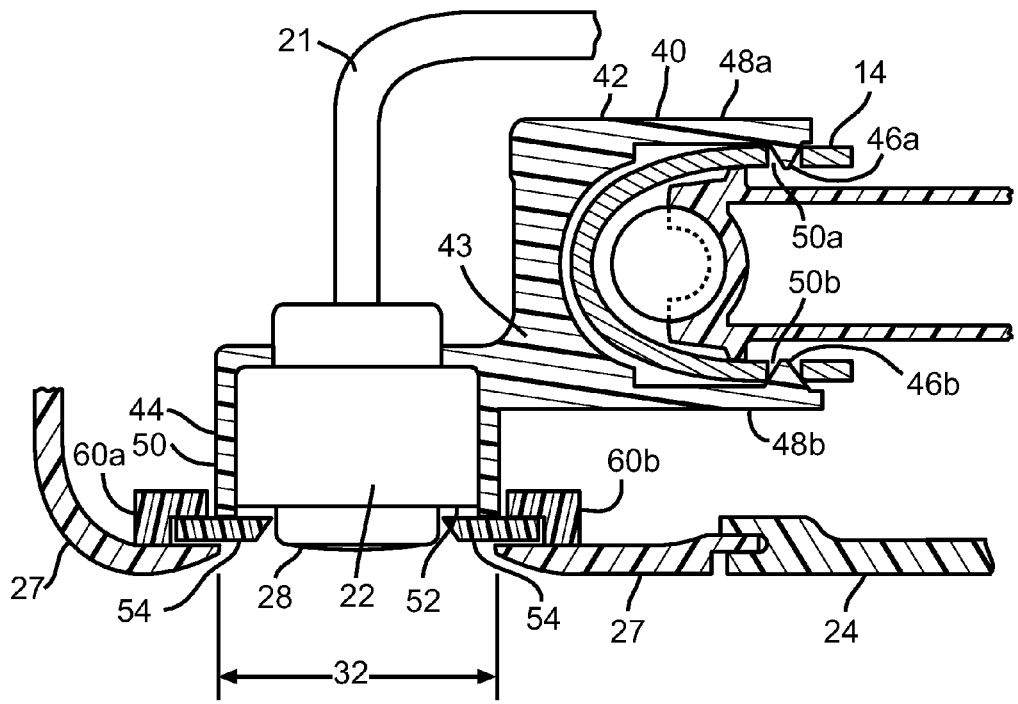
FIG. 3A is a cross-sectional view, taken along the line 3-3 of FIG. 2A, of a portion of the telescoping side view mirror assembly of FIG. 1.
Figure 4A:
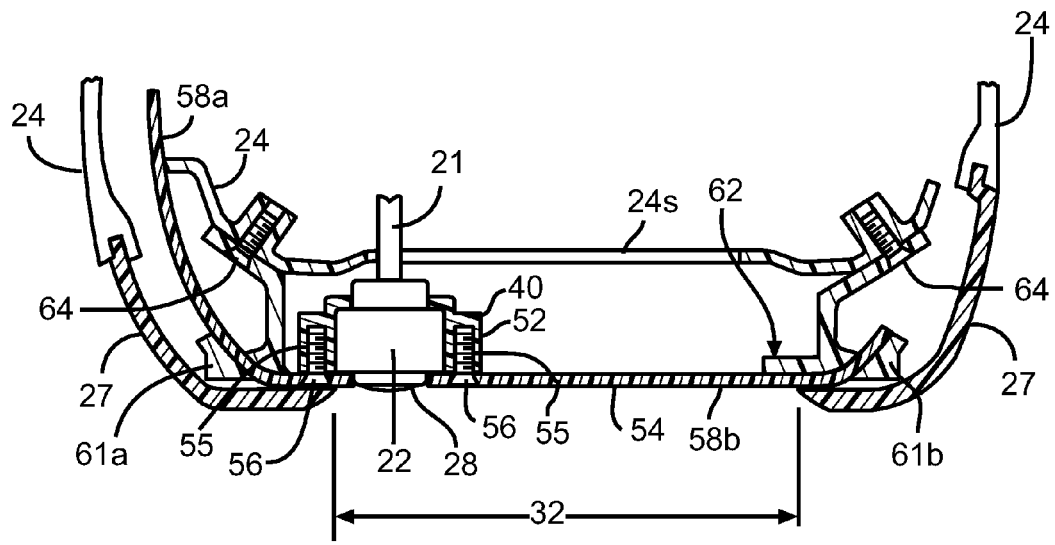
FIG. 4A is a cross-sectional view, taken along the line 4-4 of FIG. 2A, of a portion of the telescoping side view mirror assembly of FIG. 1.
Figure 5:
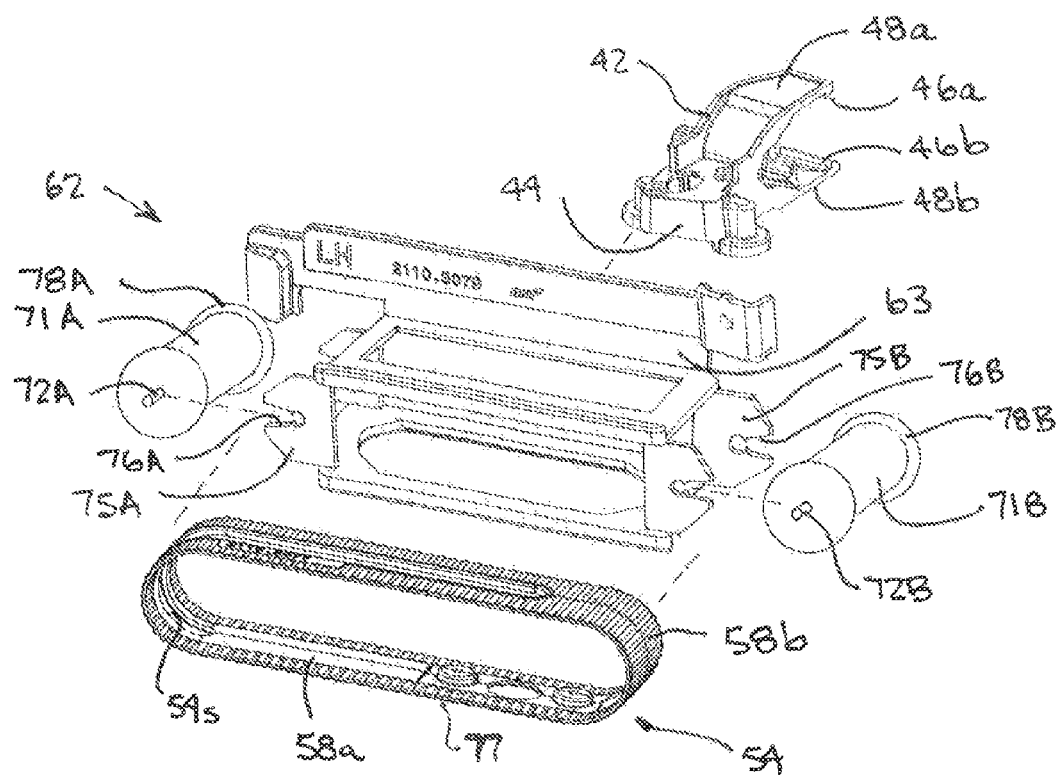
FIG. 5 is an exploded view of the embodiment of FIG. 4C.

Referring now to FIGS. 3A and 4A, portions of the camera 22, housing 24, scalp 27, lens 28, aperture 32 and a support arm 14 are illustrated. A camera holder 40 includes a first segment 42 configured for attachment to the support arm 14 and a second segment 44 configured to receive the camera 22. The first segment 42 and second segment 44 are joined by an intermediate portion, such as the neck portion 43. The first segment 42 includes snap nibs 46a and 46b positioned on opposing attachment arms 48a and 48b. The attachment arms 48a and 48b are configured to span the support arm 14 such that the snap nibs 46a and 46b engage and seat in opposing apertures 50a and 50b located on the support arm 14. Once the snap nibs 46a and 46b are seated in the apertures 50a and 50b, the camera holder 40 is fixed in position against the support arm 14. Accordingly, the camera holder 40 is stationary relative to the support arm 14 and does not move as the mirror head 16 moves in a telescoping manner along a length of the support arm 14. As best shown in FIG. 5, the snap nips 46a, 46b and corresponding receiving apertures 50a, 50b may be elongated, such as in the direction of telescoping movement, to provide greater stability against dislodgement as the housing 24 telescopes. Alternatively, the snap nibs or barb features may be found on the support structure rather than on the camera holder, and these cooperate with corresponding apertures or receiving mating features on the camera holder.

While the embodiment of the mirror assembly 10 illustrated in FIGS. 3A and 4A show the camera holder 40 attached to the support arm 14 by use of snap nibs 46a and 46b, in other embodiments the camera holder 40 can be attached to the support arm 14 by other structures, mechanisms and devices, such as the non-limiting examples of threaded fasteners, adhesives, clips and clamps.

In still another embodiment, the camera holder 40 may be secured to support structures other than the support arm 14 by attaching devices such as snap nibs similar to 46a and 46b springing into corresponding slots or apertures. In this embodiment, the slots or apertures may be located in other parts of the assembly, such as on ribs or tabs (not shown) formed in the housing 24 or the scalp 27. As a consequence of attachment at these locations, the camera remains stationary with respect to the housing.

Figure 4B:
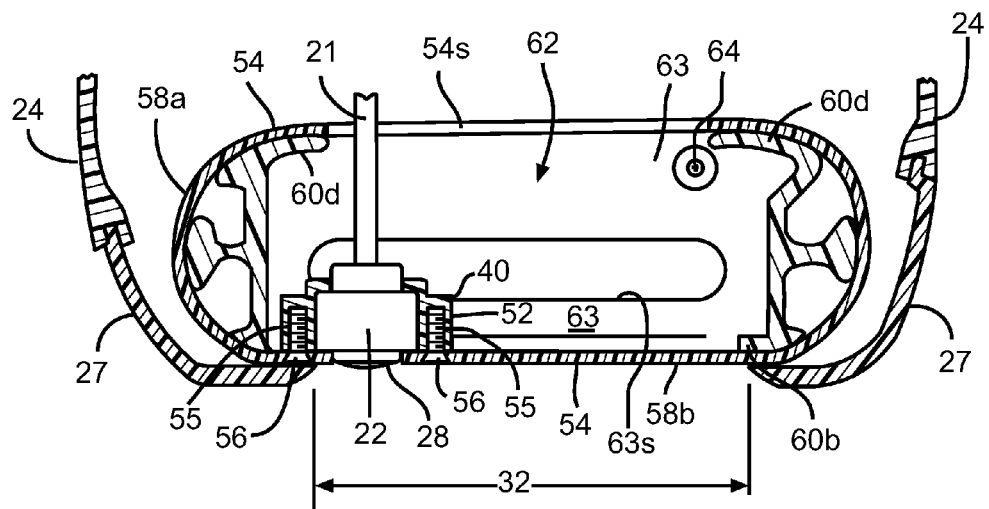
FIG. 4B is a cross-sectional view like FIG. 4A, taken along the line 4-4 of FIG. 2A but illustrating the alternative embodiment shown in FIG. 3B.

Referring now to FIGS. 3A and 4A, the second segment 44 of the camera holder 40 includes an annular boss 50. The annular boss 50 is configured to form a camera cavity 52. The camera cavity 52 is configured to receive the camera 22. The camera 22 may be retained in the camera cavity 52 by friction fit, fastener, adhesive or a flexible track 54. In the illustrated embodiment, the flexible track 54 is secured to the camera holder 40 by insertion of a plurality of threaded fasteners 56 into threaded apertures 55 (as shown in FIG. 4A, 4B). However, in other embodiments the flexible track 54 can be secured to the camera holder 40 by other structure, mechanisms and devices, including the non-limiting examples of snaps, clips and clamps.

Referring now to the embodiment of FIG. 4A, the flexible track 54 has a first portion 58a and a second portion 58b. The flexible track 54 is part of the housing maintenance system designed to protect and maintain the interior housing components by closing and partially sealing the aperture. Accordingly, the first and second portions 58a and 58b are configured to cover portions of the aperture 32 not engaged by the lens 28 of the camera 22 as the mirror head 16 moves along the support arms 14 (side to side as viewed in FIG. 4A). The mirror head 16 is shown in FIG. 4A in the extended position. In this position, the camera 22 is engaged with an inboard portion of the aperture 32 and the second portion 58b of the flexible track 54 covers the outboard portion of the aperture 32. The second portion 58b of the flexible track 54 substantially closes off the aperture 32 thereby partially protecting the interior of housing 24 from environmental elements and minimizing wind noise, while providing substantial continuity to the scalp 27 for an aesthetically pleasing appearance. While the camera 22 is engaged with the inboard portion of the aperture 32, the first portion 58a of the flexible track 54 extends between openings formed between portions of the housing 24 within the interior mirror head 16.

Referring still to FIG. 4A, in the alternative scenario where the mirror head 16 is in the retracted position, the camera 22 is engaged with an outboard portion of the aperture 32 and the first portion 58a of the flexible track 54 returns from the flexed position to cover the inboard portion of the aperture 32. While the camera 22 is engaged with the outboard position of the aperture 32, the second portion 58b of the flexible track 54 extends in a flexed manner between openings formed between portions of the housing 24 within the interior of mirror head 16.

Referring again to the embodiment shown in FIGS. 3A and 4A, the flexible track 54 is made from one or more flexible polymeric materials or films, such as for example polyurethane, polyethylene, including low density polyethylene (LDPE), polypropylene, and/or thermoplastic elastomer (TPE). Alternatively, the flexible track 54 can be made from other materials or other combinations of materials having sufficient flexibility and hardness (durometer) to allow portions of the track 54 alternatively to flex into the housing or to extend to provide a protective covering of the aperture 32.

Referring again to FIGS. 3A and 4A, opposing track guides 60a and 60b are attached to the interior of the mirror head 16 and move with the mirror head 16 as the mirror head 16 moves along the support arms 14. In this manner the opposing track guides 60a and 60b form a channel configured to maintain the first and second portions 58a and 58b of the flexible track 54 in a slideable orientation relative to the mirror head 16. From the figures it is observed that the track guides 60a and 60b maintain the flexible track 54 in an abutting relationship against the inside face of the housing 24 and scalp 27 to partially seal and close off the aperture opening. It will be appreciated that the track guides 60a and 60b may be part of a larger track guide assembly 62 that is secured to a portion of the mirror housing 24 or its scalp 27 by fasteners such as one or more screws 64. Bosses may be formed in the housing for this purpose, and slots such as 24s may be formed in housing 24 to accommodate the cables 21 or neck 43 as the mirror head 16 telescopes relative to the camera 22. The track guide assembly may include track guides bearing on an upper surface of flexible track 54, such as track guides 60a and 60b; or on a lower surface of flexible track 54, such as track guides 61a and 61b; or both.

Referring again to FIGS. 3A and 4A, in operation the housing 24, scalp 27 and track guides 60a and 60b move together as a single unit with the mirror head 16 as the mirror head 16 moves along portions of the support arms 14. In this manner the support arms 14, camera 22, camera holder 40 and track 54 do not move transversely as the mirror head moves. Regardless of the position of the mirror head 16 along the support arms 14, the lens 28 of the camera 22 is configured to view through a portion of the aperture 32 and the remainder of the aperture 32 is covered by one or both of the first and second portions 58a and 58b of the flexible track 54.

Figure 3B:
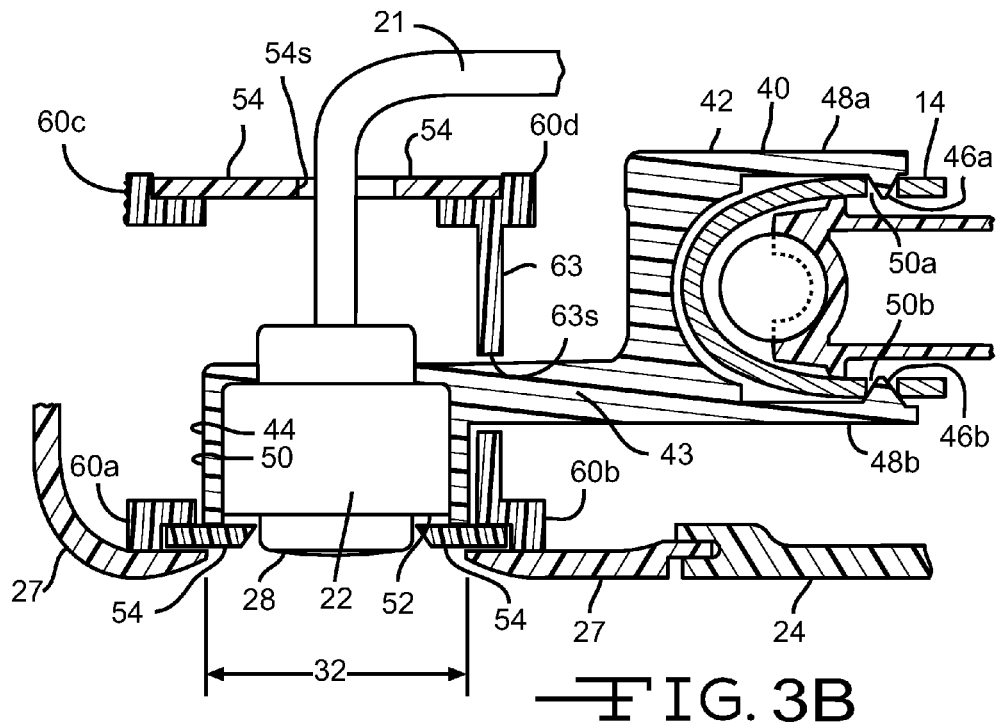
FIG. 3B is a cross-sectional view like FIG. 3A, taken along the line 3-3 of FIG. 2A but illustrating an alternative embodiment.

Referring now to FIGS. 3B and 4B, an alternate embodiment of the mirror assembly 10 is illustrated. Many portions of the base assembly 12, the support arms 14, mirror head 16, camera 22, lens 28, and aperture 32 are as described above in connection with FIGS. 3A and 4A. For example, camera holder 40 includes a first segment 42 configured for attachment to the support arm 14 and a second segment 44 configured to receive the camera 22. The first segment 42 and second segment 44 are joined by an intermediate portion, such as the neck or web 43 which, in this embodiment, may be more elongated than the neck or web 43 of FIG. 3A. Other portions are structurally and operatively substantially the same as in the embodiment previously described, such that the camera holder 40 is stationary relative to the support arm 14, mirror base 12 and vehicle 11, and the camera 22 does not move as the mirror head 16 moves in a telescoping manner along a length of the support arm 14 occupying any of infinite intermediate positions between and including a fully retracted position and a fully extended position.

Referring now to the alternate embodiment shown in FIG. 4B, the flexible track 54 is a continuous loop, having a first portion 58a and a second portion 58b, as before, but these are joined together to form a continuous band. A slot 54s may be formed in the back side of the band to allow power and signaling cables 21 to pass through the band 54. Alternatively, the cable(s) 21 may be diverted laterally to avoid having to pass through the band. When present, slot 54s does not extend to the first and second portions 58a and 58b which remain intact and attached to the camera housing 44. Consequently, portions 58a and 58b are able to cover portions of the elongated aperture 32 not engaged by the lens 28 of the camera 22 as the mirror head 16 moves along the support arms 14 (side to side as viewed in FIG. 4B).

As the mirror head 16 telescopes while the camera 22 remains stationary, the flexible track band 54 remains attached to the camera housing 44 and "rolls" within the housing 24, much like a tractor or tank tread. Multiple track guides 60a, 60b, 60c, 60d may be part of a larger track guide assembly 62 that maintains the flexible track band in proper orientation for "rolling" or sliding as the mirror head 16 telescopes relative to the fixed position of the camera 22. The internal track guides 60a, 60b, 60c and 60d may form a U-shaped channel in which the flexible track band 54 slides, and track guides at the two ends of the loop may be connected by a web or flange 63, which includes an elongated slot 63s through which the neck 43 protrudes, thus allowing the mirror head 16 to telescope back and forth while the camera 22 remains fixedly positioned on the support arm 14. Track guides bearing on an outer surface of flexible track 54 such as track guides 61a and 61b (see FIG. 4A) may also be employed, but are less important in the loop embodiment.

The track guide assembly 62 is secured to the housing 24 using fasteners such as screws 64. Bosses may be molded into the track guide assembly 62 or housing 24 for this purpose. Alternative fastening means, such as hooks, clips, welds, snap nibs, barbs and the like may be employed. In at least one variation, as illustrated in FIG. 4B, the flange 63 includes at least one aperture through which screw 64 secures the flange 63 of the track guide assembly 62 to a boss (not shown) extending from housing 24. More than one such fastener or fastener type may be used.

The mirror head 16 is shown in FIG. 4B in the extended position with the camera 22 engaged with an inboard portion of the aperture 32, and with the second portion 58b of the flexible track 54 being straightened out or "unrolled" to cover the outboard portion of the aperture. In this manner, second portion 58b of the flexible track 54 substantially closes off the aperture 32 thereby partially protecting the interior of housing 24 from environmental elements and minimizing wind noise, while providing substantial continuity to the scalp 27 for an aesthetically pleasing appearance. Meanwhile, the first portion 58a of the flexible track 54 rolls up around the track guide assembly 62 within the housing 24.

In the alternative scenario where the mirror head 16 telescopes to the retracted position, the camera 22 is engaged with an outboard portion of the aperture 32 and the first portion 58a of the flexible track 54 "unrolls" or straightens from the looped position to cover the inboard portion of the aperture 32, while the second portion 58b of the flexible track 54 "rolls up" around the track guide assembly 62 within the interior of mirror head 16.

Still referring to the embodiment shown in FIGS. 3B and 4B, the flexible track band 54 is made from one or more flexible polymeric materials or films, such as for example polyurethane, polyethylene, including low density polyethylene (LDPE), polypropylene, and/or thermoplastic elastomer (TPE). Alternatively, the flexible track 54 can be made from other materials or other combinations of materials having sufficient flexibility and hardness (durometer) to allow portions of the track 54 to alternatively "roll up" around the track guide and straighten or "unroll" to provide a protective covering of the aperture 32.

Figure 4C:
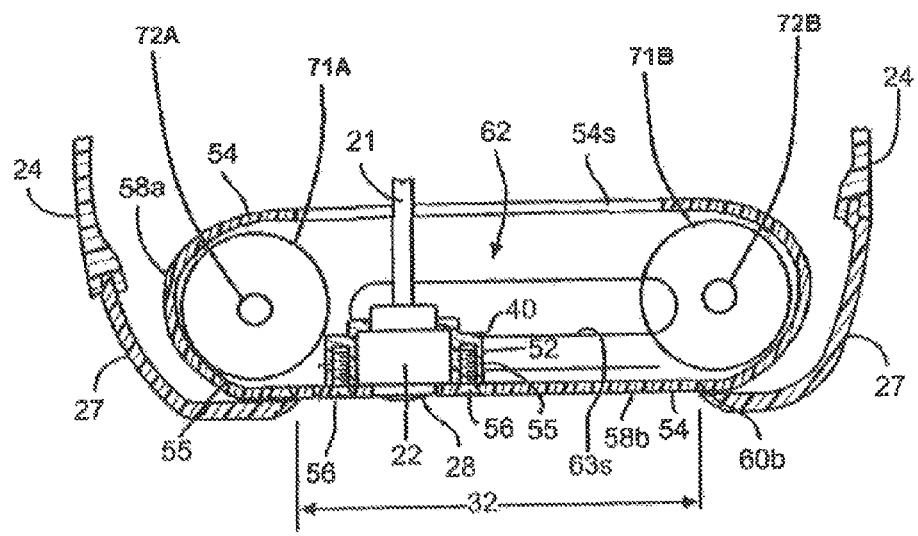
FIG. 4C is a cross-sectional view like FIG. 4B, but illustrating yet another alternative embodiment.

In still another embodiment, shown in FIGS. 4C and 5, the flexible track 54 rolls around roller drums 71A and 71B having axles 72A and 72B that are shafts rotatably journaled in the track guide assembly 62. As best seen in FIG. 5, the track guide assembly 62 may include at each end a pair of plates or sidewall extensions 75A, 75B having apertures for rotatably journaling the shafts of roller drum axles 72A and 72B. For example, the plates or extensions 75A, 75B may be provided with forked slots 76A and 76B into which the axle shafts may be inserted for securely supporting the roller drums in a rotatable manner. Alternatively, roller drum axle shaft end faces may be rounded or conical and fit into an indentation or aperture in sidewall extensions of the track guide assembly 62. Roller drums 71A and 71B may optionally be provided with a reduced diameter central portion that is wide enough to accommodate the width of the flexible track 54, and larger diameter end portions that create flanges 78A, 78B that serve the function of track guides (analogous to 60a, 60b, 60c and 60d) to retain the flexible track in position aligned with the aperture 32. The flexible track and/or the roller drums may be designed with transverse ridges or treads 77 to improve frictional engagement of the track with the roller drums.

Figure 6A:
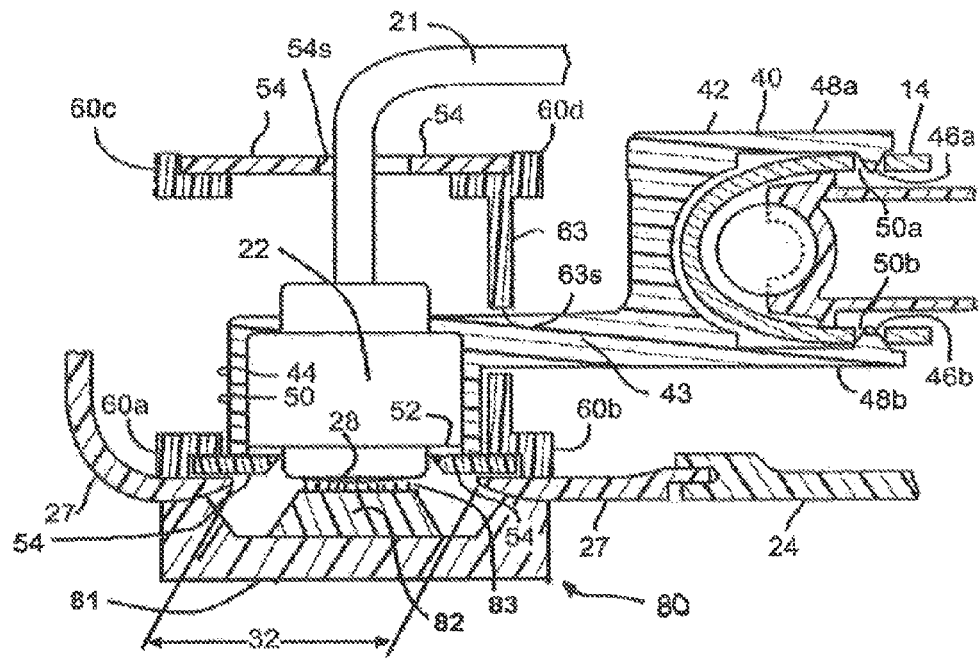
FIGS. 6A and 6B are cross-sectional views similar to FIGS. 3A and 4A respectively, but they depict an additional lens cleaning embodiment.
Figure 6B:
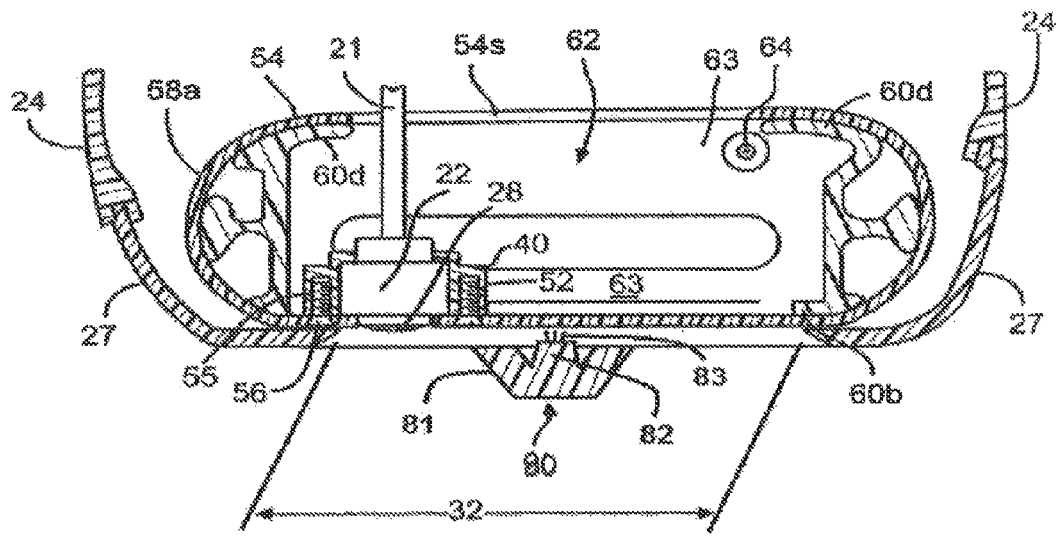

Referring now, to FIGS. 6A and 6B, an additional optional housing maintenance feature is shown for cleaning the camera lens 28. Lens cleaning system 80 is designed to keep the camera lens 28 clear of dust, dirt, and other road debris associated with driving vehicles. In an exemplary embodiment, lens cleaning system 80 includes a bracket 81 that extends over the elongated aperture 32 to support a wiper element 83 in a position where it will engage the lens 28 as the housing 24 telescopes. "Extending over" in this context does not mean occluding the whole elongated aperture 32. To the contrary, the wiper element 83 and the whole cleaning system 80 will typically occupy not more than about one-third of the length of the elongated aperture 32 (for example, 30% or less, 25% or less, or 20% or less), and is in a central region of the aperture. This ensures that the camera lens 28 is still operational and not occluded at the extreme inboard and extreme outboard positions, yet each time the housing telescopes, the wiper element 83 passes over and contacts the lens 28 to wipe it clean.

In the embodiment shown in FIG. 6A, the bracket 81 does span the width of the elongated aperture 32 attaching to the housing scalp 27 both fore and aft of the aperture 32. This may be optimal to provide better rigidity to the wiper element 83, but spanning the aperture is not required by the term "extending over" the aperture.

The bracket 81 may be made of plastic or similar material as the housing 27. In fact, the bracket 81 may be molded integrally with the housing 24 (or its scalp 27), or it may be a separate part that is attached to the housing or scalp by fasteners such as screws, rivet, snap-fittings or the like. The wiper holder 82 may likewise be molded as part of the bracket 81 or it may be a distinct part for ease of replacement. The wiper holder 82, whether integral or a separate part, holds and supports the wiper element 83 at a position just into the path of the lens 28. Thus, each time the housing 24 and its cleaning system 80 telescopes past the lens 28, the wiper element 83 can engage and clean or "squeegee" the lens 28.

The wiper element 83 is not limited in composition, but is generally of a resilient nature to maintain contact with the camera lens 28. Resilient springs or pads (not shown) may be used between the holder 82 and wiper element 83 to assist in maintaining contact of the wiper element with the camera lens. The wiper element 83 may be any fabric, elastomeric, sponge, brush, or combination of these. In some embodiments, the wiper element may be a molded elastomeric polymer blade, similar to a windshield wiper blade. This may serve as the sole or unitary wiper element. In other embodiments, the wiper element may be a composite assembly of two or more individual elements, such as both a brush and an elastomeric polymer blade, or both a fabric and an elastomeric polymer blade, or both a brush and a fabric. Some useful polymeric materials that may be molded into resilient wiper blade elements include TPE (thermoplastic elastomers), LDPE (low density polyethylene), natural rubber, and silicone. Regardless which type of wiper element 83 is used, the wiper element may desirably be a separate, replaceable element that facilitates maintenance and servicing of the lens cleaning system. An exhausted wiper element 83, whether blade or brush or fabric pad or a combination of these, can quickly and easily be extracted from the wiper holder 82, and a fresh, new wiper element 82 can be snapped into the wiper holder 82 in its place.

Figure 6C:
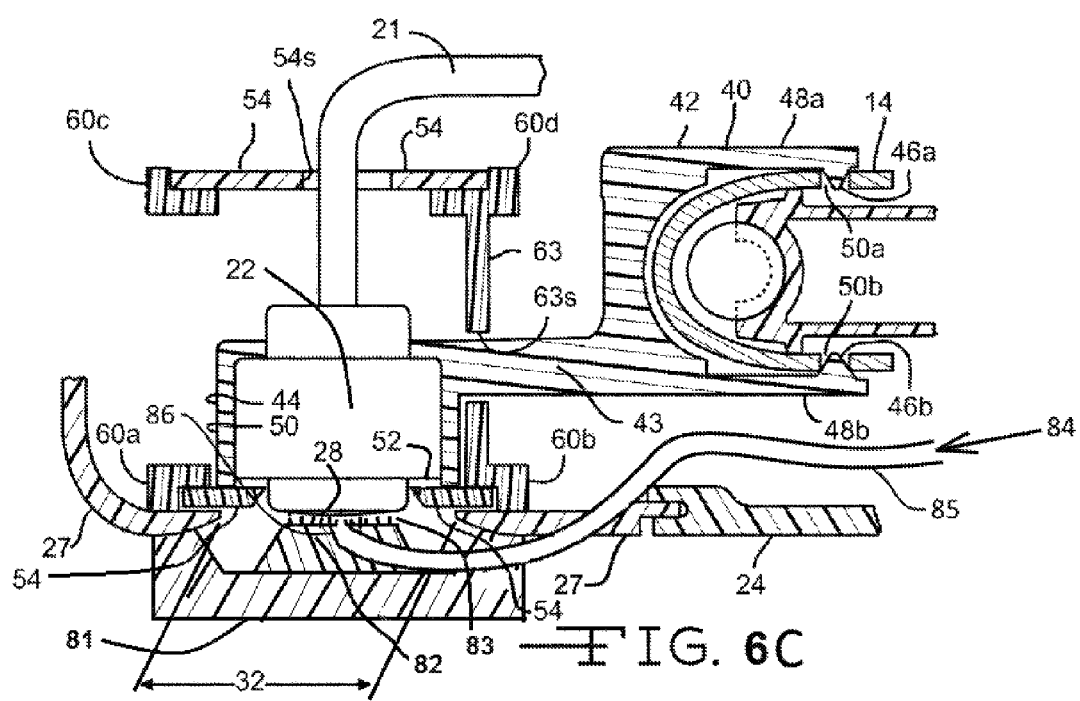
FIG. 6C is cross-sectional views similar to FIG. 6A, but showing an embodiment with an additional lens cleaning feature.

FIG. 6C shows yet another embodiment of the housing maintenance system. In this embodiment washer fluid from a source 84 is introduced into the system and travels down tube 85. At the end of tube 85 is orifice 86. As fluid exits through orifice 86 it is dispersed onto or into the area of wiper element 83. In this manner, as the housing 24 is telescoped past the lens 28, the wiper element 83 is now wetted and able to wash the lens 28. The manner with which the fluid is introduced into the tube 85 from the source 84 may be from a pump, a pressurized gas, or a gravity feed system, using solenoid valves or other conventional controls, any of which may be activated manually or automatically. In certain embodiments, the fluid is introduced into tube 85 when the mirror is telescoped (either when extended or when retracted, or both).

In a variation, the tube 85 and its orifice 86 could be aimed at the camera lens 28 itself rather than the wiper element 83. But since the housing 24 and camera lens 28 move relative to one another, the orifice 86 may be directed toward the lens 28 only as certain positions of the housing, such as the when the mirror housing 24 is in the retracted position. In this manner, the lens 28 is wetted just prior to the housing 24 being telescoped outwardly, then as the wiper 83 passes over the lens 28, a squeegee action cleans the lens 28. Alternatively, the orifice 86 may be directed toward the lens 28 when the mirror housing 24 is in the extended position. In this manner, the lens 28 is wetted just prior to the housing being telescoped inwardly, then as the wiper 83 passes over the lens 28, a squeegee action cleans the lens 28.

The principle and mode of operation of the side view mirror assembly with a stationary camera and telescoping mirror head has been described in certain embodiments. However, it should be noted that the side view mirror assembly with a stationary camera and telescoping mirror head may be practiced otherwise than as specifically illustrated and described without departing from its scope.

What is claimed is:

1. A side-location telescoping rearview assembly comprising:
   one or more support arms attached to and extending from a base assembly configured for attachment to a side portion of a vehicle;
   a rearview housing slidingly attached to the one or more support arms such that the housing can telescope relative to the base between a retracted, inboard position and an extended, outboard position; and a camera positioned within the housing and attached to the one or more support arms, the camera configured to provide images exterior to the vehicle via a lens having a view area through an elongated aperture in the housing, wherein the camera lens is configured to remain in a stationary position relative to the base as the housing telescopes, and wherein the elongated aperture is configured relative to the camera lens such that the camera can obtain view area images exterior to the vehicle through the elongated aperture as the housing is telescoped between the inboard and outboard positions; and further comprising a housing maintenance system for keeping the housing clean and operable.

2. The side-location telescoping rearview assembly of claim 1, wherein the housing maintenance system comprises a flexible track for closing the aperture in areas adjacent the camera lens.

3. The side-location telescoping rearview assembly of claim 2, wherein the flexible track is held in position within the housing by one or more track guides.

4. The side-location telescoping rearview assembly of claim 1, wherein the housing maintenance system comprises a lens cleaning system.

5. The side-location telescoping rearview assembly of claim 4, wherein the lens cleaning system comprises a bracket fixed to the housing and extending over the elongated aperture, a wiper holder disposed in the bracket, and a wiper element held by the wiper holder, whereby the wiper element is adapted to engage and clean the lens in the elongated slot as the housing is telescoped between the inboard and outboard positions.

6. The side-location telescoping rearview assembly of claim 5, wherein the bracket is integrally molded with a portion of the rearview housing.

7. The side-location telescoping rearview assembly of claim 5, wherein the bracket is attached to the rearview housing by fasteners.

8. The side-location telescoping rearview assembly of claim 5, wherein the wiper element is selected from a brush, a fabric, an elastomeric blade, or a combination thereof.

9. The side-location telescoping rearview assembly of claim 5, wherein the wiper element comprises a material selected from a thermoplastic elastomer (TPE), a low density polyethylene (LDPE), rubber, felt, soft fabric, or a sponge-like material.

10. The side-location telescoping rearview assembly of claim 5, wherein the wiper element of the lens cleaning system occupies less than one third the length of the elongated slot.

11. The side-location telescoping rearview assembly of claim 5, further comprising source of washer fluid and a dispensing tube configured to dispense washer fluid onto the wiper element.

12. The side-location telescoping rearview assembly of claim 5, further comprising source of washer fluid and a dispensing tube configured to dispense washer fluid onto the camera lens.

13. The side-location telescoping rearview assembly of claim 1, wherein the housing maintenance system further comprises a source of washer fluid and a dispensing tube configured to dispense washer fluid onto the camera lens.

14. The side-location telescoping rearview assembly of claim 13, wherein the housing maintenance system further comprises a pressure system for dispensing the washer fluid onto the camera lens under high pressure.

15. A side-location telescoping rearview assembly comprising:

one or more support arms attached to and extending from a base assembly configured for attachment to a side portion of a vehicle;

a rearview housing slidingly attached to the one or more support arms such that the housing can telescope relative to the base between a retracted, inboard position and an extended, outboard position; and a camera positioned within the housing and attached to the one or more support arms, the camera configured to provide images exterior to the vehicle via a lens having a view area through an elongated aperture in the housing, wherein the camera lens is configured to remain in a stationary position relative to the base as the housing telescopes, and wherein the elongated aperture is configured relative to the camera lens such that the camera can obtain view area images exterior to the vehicle through the elongated aperture as the housing is telescoped between the inboard and outboard positions; and further comprising a lens cleaning system having a bracket fixed to the housing and extending over the elongated aperture, a wiper holder disposed in the bracket, and a wiper element held by the wiper holder, whereby the wiper element is adapted to engage and clean the lens in the elongated slot as the housing is telescoped between the inboard and outboard positions.

16. The side-location telescoping rearview assembly of claim 15, wherein the wiper element is selected from a brush, a fabric, an elastomeric blade, or a combination thereof.

17. The side-location telescoping rearview assembly of claim 15, wherein the wiper element comprises a material selected from a thermoplastic elastomer (TPE), a low density polyethylene (LDPE), rubber, felt, soft fabric, or a sponge-like material.

18. The side-location telescoping rearview assembly of claim 15, wherein the wiper element of the lens cleaning system occupies less than one third the length of the elongated slot.

19. The side-location telescoping rearview assembly of claim 15, further comprising source of washer fluid and a dispensing tube configured to dispense washer fluid onto the wiper element.

* * * * *